US012756666B2

(12) United States Patent
Bloch et al.

(10) Patent No.: US 12,756,666 B2
(45) Date of Patent: Oct. 6, 2026

(54) LOAD BALANCING BETWEEN NETWORK DEVICES BASED ON COMMUNICATION LOAD

(71) Applicant: Mellanox Technologies, Ltd., Yokneam (IL)

(72) Inventors: Noam Bloch, Bat Shlomo (IL); Lior Narkis, Petah Tikva (IL); Daniel Marcovitch, Yokneam Illit (IL); Ran Avraham Koren, Haifa (IL)

(73) Assignee: Mellanox Technologies, Ltd., Yokneam (IL)

(*) Notice: Subject to any disclaimer, the term of this patent is extended or adjusted under 35 U.S.C. 154(b) by 81 days.

(21) Appl. No.: 18/638,756

(22) Filed: Apr. 18, 2024

(65) Prior Publication Data

US 2025/0330425 A1 Oct. 23, 2025

(51) Int. Cl.
*G06F 15/173* (2006.01)
*H04L 43/0876* (2022.01)
*H04L 47/125* (2022.01)

(52) U.S. Cl.
CPC ........ *H04L 47/125* (2013.01); *H04L 43/0876* (2013.01)

(58) Field of Classification Search
None
See application file for complete search history.

(56) References Cited

U.S. PATENT DOCUMENTS 7,349,960 B1 * 3/2008 Pothier .............. G06F 16/2465 709/224
11,669,372 B2 * 6/2023 Guim Bernat ...... H04L 67/1029 709/226
11,809,395 B1 * 11/2023 Fan .................... G06F 16/2228
2006/0075119 A1 4/2006 Hussain et al.
2019/0104206 A1 * 4/2019 Goel ...................... H04L 45/64
2021/0051519 A1 * 2/2021 Bedekar ............. H04W 28/086
2021/0058453 A1 * 2/2021 Balasubramanian ........................ H04L 67/101
2023/0179536 A1 * 6/2023 Sathasivan ............. H04L 47/70 709/226
2024/0111691 A1 4/2024 Biederman et al.
(Continued)

FOREIGN PATENT DOCUMENTS

WO 2017156549 A1 9/2017
WO 2018125250 A1 7/2018

OTHER PUBLICATIONS

Barrett et al, Sandia Report, Sandia National Laboratories, "The Portals 4.0 Network Programming Interface" SAND2012-10087, 150 pages, Nov. 2012.
(Continued)

*Primary Examiner* — Phuoc H Nguyen
(74) *Attorney, Agent, or Firm* — Meitar Patents LTD.; Daniel Kligler

(57) ABSTRACT

A system includes multiple network devices and one or more processors. The network devices are to connect to a network. The one or more processors are to exchange communication traffic over the network via the multiple network devices, to estimate multiple communication loads experienced respectively by the multiple network devices, and to distribute subsequent communication traffic among the multiple network devices, responsively to the multiple estimated communication loads.

20 Claims, 2 Drawing Sheets

(56) References Cited

U.S. PATENT DOCUMENTS

2024/0314203 A1 9/2024 Hausauer et al.

OTHER PUBLICATIONS

Non-Final Office Action, U.S. Appl. No. 18/664,336, dated May 20, 2026.
List of Cited References, U.S. Appl. No. 18/664,336, dated May 20, 2026.

* cited by examiner

LOAD BALANCING BETWEEN NETWORK DEVICES BASED ON COMMUNICATION LOAD

FIELD OF THE INVENTION

The present invention relates generally to network communication, and particularly to methods and systems for load balancing between network devices.

BACKGROUND OF THE INVENTION

In some communication systems, a processor or a group of processors may connect to a network using multiple network adapters. One example of such a system is a Graphics Processing Unit (GPU) that connects to a network using two Network Interface Controllers (NICs) or Data Processing Units (DPUs).

SUMMARY OF THE INVENTION

An embodiment of the present invention that is described herein provides a system including multiple network devices and one or more processors. The network devices are to connect to a network. The one or more processors are to exchange communication traffic over the network via the multiple network devices, to estimate multiple communication loads experienced respectively by the multiple network devices, and to distribute subsequent communication traffic among the multiple network devices, responsively to the multiple estimated communication loads.

In some embodiments, the one or more processors are to distribute the subsequent communication traffic in accordance with a criterion that aims to balance the multiple communication loads.

In some embodiments, the one or more processors are to identify uncompleted work requests associated with a network device, and to estimate a communication load of the network device by estimating at least an amount of the communication traffic corresponding to the uncompleted work requests. In a disclosed embodiment, the one or more processors are to estimate the communication load based on both (i) the uncompleted work requests and (ii) one or more read requests sent to the network device over the network.

In some embodiments, the one or more processors are to exchange the communication traffic via a network device by posting work descriptors, indicative of work requests, on one or more queues associated with the network device; the network device is to issue one or more completion notifications upon completing the work requests; and the one or more processors are to estimate the communication load of the network device by (i) incrementing a load counter in response to posting a new work descriptor, and (ii) decrementing the load counter in response to identifying a new completion notification.

In an example embodiment, the one or more processors are to increment the load counter responsively to a data-size indicated in the new work descriptor. In an embodiment, the one or more processors are to decrement the load counter responsively to a data-size indicated in the new completion notification, or in a work descriptor that corresponds to the new completion notification. In some embodiments, the one or more processors are to increment and decrement the load counter by issuing atomic fetch-and-add instructions.

In some embodiments, the one or more processors are to exchange the communication traffic via a network device by posting work descriptors, indicative of work requests, on one or more queues associated with the network device; the network device is to issue one or more completion notifications upon completing the work requests; the one or more processors are to increment a load counter in response to posting a new work descriptor; the network device is to decrement the load counter in response to issuing a new completion notification; and the one or more processors are to estimate the communication load of the network device based on the load counter.

In disclosed embodiments, the network device is to decrement the load counter responsively to a data-size indicated in the new completion notification, or in a work descriptor corresponding the to new completion notification. In an example embodiment, the network device is to perform an interim decrement of the load counter during processing of a work request.

In a disclosed embodiment, the one or more processors are to communicate with the network device via a peripheral bus, the load counter resides in a memory of the one or more processors, and the network device is configured to increment the load counter by issuing atomic fetch-and-add operations of the peripheral bus. In another embodiment, the load counter includes (i) a first counter to count new work and (ii) a second counter to count completed work, and the one or more processors are to (i) increment the load counter by incrementing the first counter, and (ii) decrementing the load counter by incrementing the second counter.

In an embodiment, the network device is to perform an interim re-estimation of the communication load during processing of a work request. In another embodiment, the network device is to perform an interim re-estimation of the communication load based on an amount of traffic sent to the network and not yet acknowledged.

In some embodiments, the network devices are to indicate to the one or more processors respective actual communication rates of the network devices, and the one or more processors are to normalize the communication loads by the respective actual communication rates. In an embodiment, the communication traffic is associated with multiple Virtual Lanes (VLs) or priority classes, and the one or more processors are to estimate the communication loads and the actual communication rates separately per VL or priority class. In an example embodiment, the one or more processors are to estimate a communication load for a VL or priority class based on the estimated communication load of another VL or priority class.

In an embodiment, the communication traffic is associated with multiple Virtual Lanes (VLs) or priority classes, and the one or more processors are to estimate a communication load for a given queue, which is associated with a given VL or priority class, based on: (i) the communication load on one or more other queues that are associated with the given VL or priority class, and (ii) the communication load on one or more other queues that are associated with one or more other VLs or priority classes.

There is additionally provided, in accordance with an embodiment that is described herein, a method including exchanging communication traffic over a network via multiple network devices. Multiple communication loads, experienced respectively by the multiple network devices, are estimated. Subsequent communication traffic is distributed among the multiple network devices, responsively to the multiple estimated communication loads.

The present invention will be more fully understood from the following detailed description of the embodiments thereof, taken together with the drawings in which:

DETAILED DESCRIPTION OF EMBODIMENTS

Overview

Figure 1:
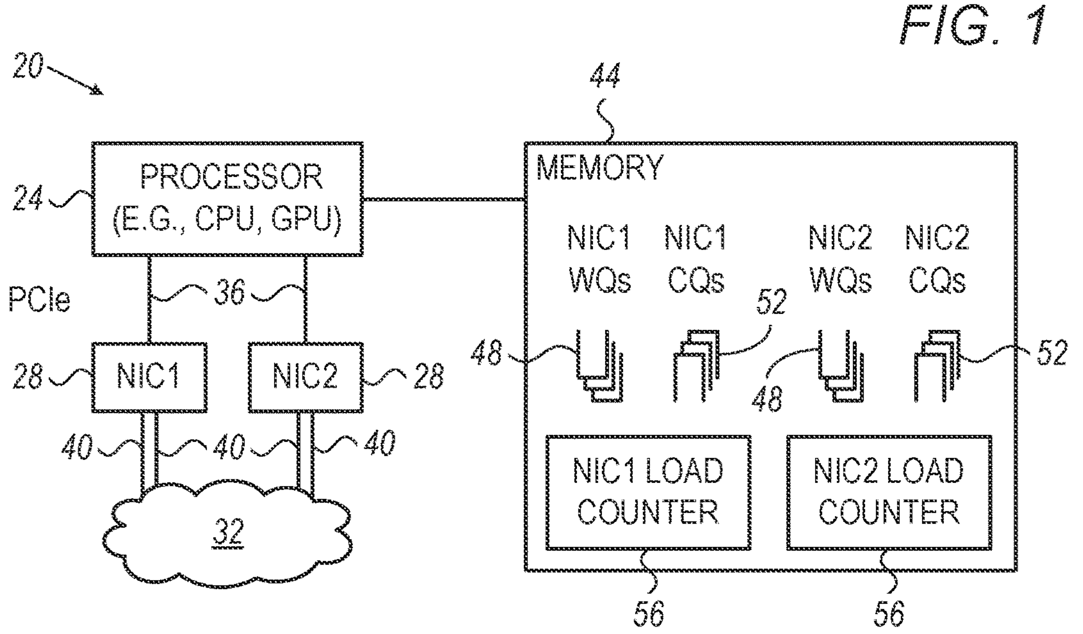
FIG. 1 is a block diagram that schematically illustrates a computing system employing load balancing between two network devices, in accordance with an embodiment of the present invention.

Various existing and emerging computing system configurations comprise a plurality of network devices, e.g., network adapters, that together serve a processor or a group of processors. As communication rates increase, it becomes important to utilize the network device resources efficiently. In particular, it is important to balance the communication load among the network devices. A well-balanced set of network devices provides superior performance, e.g., high throughput, low latency, low jitter and fast completion of jobs involving multiple network operations.

Embodiments of the present invention that are described herein provide methods and systems that balance the communication load between network devices. The disclosed techniques estimate, and aim to balance, the actual communication loads experienced by the network devices.

In disclosed embodiments, a system comprises one or more processors that connect to a network via multiple network devices. The processors estimate multiple communication loads that are experienced respectively by the multiple network adapters. The processors distribute subsequent communication traffic among the multiple network the devices responsively to multiple estimated communication loads.

The terms "network adapter" and "network device", as used herein, refer to any type of network device, e.g., Network Interface Card (NIC), Host Channel Adapter (HCA), SmartNIC or DPU. These terms are used interchangeably throughout the application. The description that follows refers mainly to network adapters or NICs, for simplicity.

The embodiments described herein refer mainly to a single processor, for the sake of clarity. The disclosed techniques, however, can be used in a similar manner for balancing the traffic load of a group of processors that share multiple network devices.

In a typical embodiment, a processor and a given network adapter exchange Work Requests (WRs) and completion notifications via one or more queues (e.g., one or more Work Queues—WQs and one or more Completion Queues—CQs). The processor sends a WR to a network adapter by posting a work descriptor (e.g., Work-Queue Element—WQE) on a queue associated with the network adapter. WRs may request the network adapter to perform Remote Direct Memory Access (RDMA) WRITE or READ transactions, for example. Upon completing a WR, the network adapter sends the processor a completion notification, e.g., by posting a Completion Queue Element (CQE) on a CQ associated with the network adapter. In another typical embodiment, the completion notification is implemented in the form of increasing a counter by a value. The counter address or index, and the value, can be defined in the WR.

The embodiments described herein refer mainly to WQs, CQs, WOEs and COEs, by way of non-limiting example. The disclosed techniques can be used with any other suitable types of queues, work descriptors and completion notifications. Thus, in the present context, the terms "WQ" and "WQE" are regarded herein as examples of queues and work descriptors, respectively. Although some of the terminology in the following description is commonly used in InfiniBand™ (IB) networks, the disclosed techniques are in no way limited to any specific communication protocol or network type.

In some embodiments, the processor estimates the communication load experienced by a network adapter based on information obtained from the WQs and/or the Cos associated with the network adapter. Example types of communication loads that can be estimated and used for load balancing include:

- "Outbound load"—The total amount of data that was provided to a network adapter for sending to the network but not yet completed. In an example embodiment, the outbound load can be estimated as the total byte count accumulated over all WRITE WQEs that were posted on the WQs of the network adapter but not yet completed. Within the total byte count of uncompleted WRITE WQEs, a more accurate estimate would exclude the number of bytes that were already sent to the network.
- "Inbound load"—The total amount of data that was requested to be read by network adapter over the network but not yet completed. An example estimate of the inbound load comprises the total byte count accumulated over all READ WQEs that were posted on the network adapter's WQs but not yet completed. Here, too, within the total byte count of uncompleted READ WQEs, a more accurate estimate would exclude the number of bytes that were already fetched over the network.

In some embodiments, the processor maintains a respective "load counter" for each of the network adapters. The load counters typically comprise memory locations, e.g., in the processor's memory, which hold values indicative of the communication loads of the network adapters. The load counters are typically incremented upon sending new WRs to the network adapters, and decremented upon completing the WRs. The processor uses the load counters to decide how to distribute new WRs to the network adapters.

In some embodiments, the load counters are incremented and decremented by software running in the processor. In other embodiments, the load counters are incremented by the processor's software, and decremented by hardware residing in the network adapters. Examples of both alternatives are described herein.

In some embodiments, a given load counter is implemented using a pair of load counters. One of the counters is incremented when work is posted to the network adapter, and the other counter is incremented when the work is completed. The difference between the two counter values is used as the composite value of the load counter.

System Description

FIG. 1 is a block diagram that schematically illustrates a computing system 20 employing load balancing between two network devices, in accordance with an embodiment of the present invention. System 20 comprises a processor 24 and two network adapters 28. Processor 24 exchanges communication traffic with a network 32 via network adapters 28.

Processor 24 may comprise, for example, a Central Processing Unit (CPU), a Graphics Processing Unit (GPU), or any other suitable type of processor. As noted above, the description below refers mainly to a single processor, for simplicity of explanation. In alternative embodiments the disclosed techniques are used with a group of processors that together communicate via network adapters 28.

In the embodiment of FIG. 1, network adapters 28 are Ethernet Network Interface Controllers (NICs) denoted NIC1 and NIC2. In other embodiments, network adapters 28 may comprise any other suitable type of network adapter, e.g., InfiniBand™ (IB) Host Channel Adapters (HCAs). In the present example system 20 comprises two network adapters, although any other suitable number of network adapters can be used.

Each NIC 28 communicates with processor 24 via a peripheral bus 36. In the present example, bus 36 is a Peripheral Component Interconnect express (PCIe) bus. Alternatively, any other suitable peripheral bus, e.g., NVLINK, can be used. Each NIC communicates with network 32 using one or more network ports 40. Further alternatively, any of NICs 28 may be connected to processor 24 by a direct connection, i.e., not via a peripheral bus.

A given network adapter typically comprises a host interface for communicating with processor 24 over bus 36, one or more network interfaces for communicating with network 32, and circuitry that carries out the various processing tasks of the network adapter.

System 20 further comprises a memory 44, typically a Random-Access Memory (RAM). Memory 44 is accessible by processor 24 and by NICs 28. Processor 24 maintains in memory 44, for each NIC 28, (i) one or more Work Queues (WQs) 48, and (ii) one or more Completion Queues (CQs) 52.

To assign a new Work Request (WR) to a certain NIC 28, processor 24 posts a Work-Queue Element (WQE) on one of WQs 48 of the NIC. The WQE may request the NIC, for example, to perform an RDMA WRITE transaction that writes certain data to a remote memory across network 32. As another example, the WQE may request the NIC to perform an RDMA READ transaction that fetches certain data from a remote memory across network 32. Other suitable types of WQEs (like SEND) can also be used. Upon completing execution of a WR, a given NIC 28 reports the completion to processor 24 by posting a Completion-Queue Element (CQE) on one of CQs 52 associated with the NIC.

Additionally, processor 24 maintains in memory 44 a respective load counter 56 for each NIC 28. The use of load counters 56 in load balancing is described in detail below.

Figure 2:
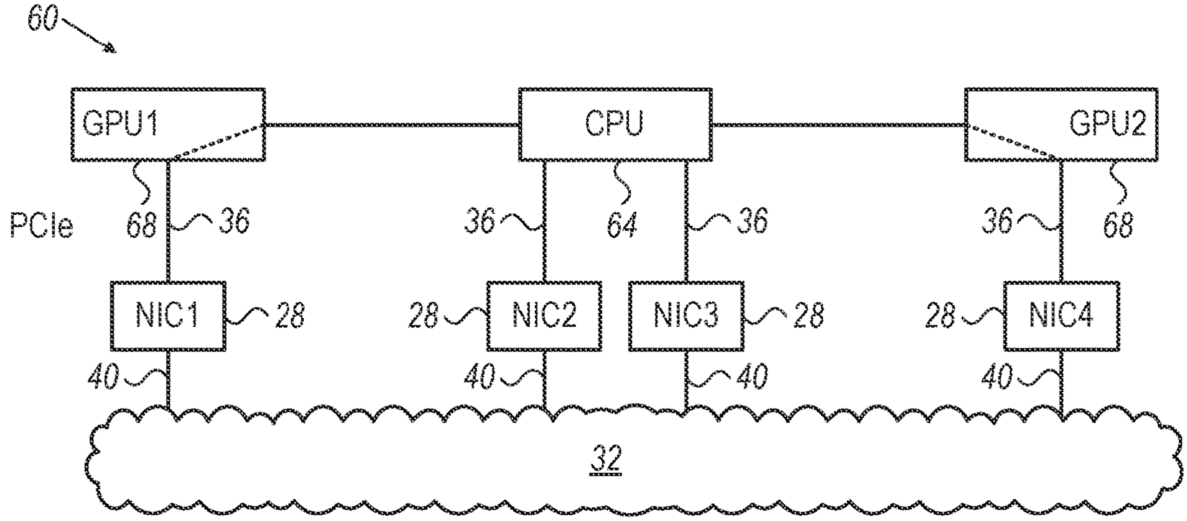
FIG. 2 is a block diagram that schematically illustrates a computing system employing load balancing among four network devices, in accordance with an alternative embodiment of the present invention.

FIG. 2 is a block diagram that schematically illustrates another computing system 60 employing load balancing among four network devices, in accordance with an alternative embodiment of the present invention. System 60 comprises a CPU 64, two GPUs 68 denoted GPU1 and GPU2, and four NICs 28 denoted NIC1-NIC4.

In the present example, CPU 64 is connected by suitable communication interfaces to GPU1 and GPU2. NIC1 is connected to GPU1 by a PCIe link 36, NIC2 and NIC3 are connected to CPU 64 by two respective PCIe links 36, and NIC4 is connected to GPU2 by a fourth PCIe link 36. Given this physical connectivity, CPU 64 is able to exchange communication traffic with network 32 via any of the four NICs 28 (NIC1-NIC4).

As demonstrated by FIGS. 1 and 2, the phrase "a processor exchanges communication traffic via a network adapter," in various grammatical forms, refers both to direct and indirect t physical connection between the processor and the network adapter. In the example of FIG. 2, CPU 64 may use the disclosed techniques for balancing the load of the communication traffic exchanged via NIC1-NIC4.

The configurations of systems 20 and 60, as shown in FIGS. 1 and 2, are example configurations that are chosen purely for the sake of conceptual clarity. In alternative embodiments, any other suitable configurations can be used. Elements that are not necessary for understanding the principles of the present invention have been omitted from the figures for clarity.

The various elements of systems 20 and 60, including the various disclosed processors and network adapters, may be implemented in hardware, e.g., in one or more Application-Specific Integrated Circuits (ASICs) or FPGAS, in software, or using a combination of hardware and software elements. In some embodiments, certain elements of the disclosed processors and network adapters may be implemented, in part or in full, using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Load Balancing Between Network Adapters Based on Communication Load

As noted above, in some embodiments, processor 24 (FIG. 1) balances the communication load between NIC1 and NIC2 using information extracted from the WQEs and/or CQEs posted on WQs 48 and/or CQs 52. For this purpose, processor 24 maintains two load counters 56, one for NIC1 and the other for NIC2, in memory 44.

Figure 3:
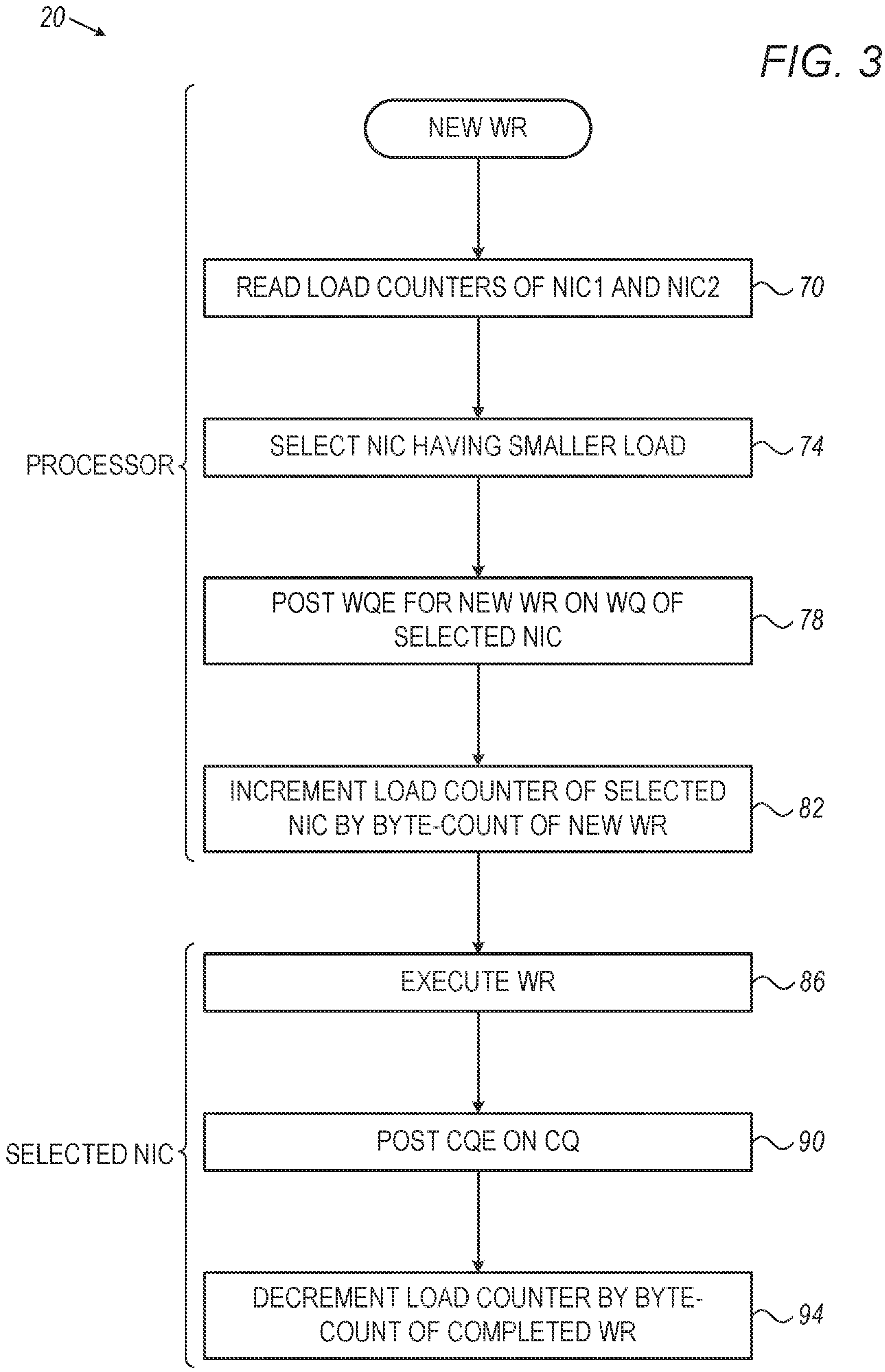
FIG. 3 is a flow chart that schematically illustrates a method for load balancing between two network devices, in accordance with an embodiment of the present invention.

FIG. 3 is a flow chart that schematically illustrates a method for load balancing between network devices, in accordance with an embodiment of the present invention. The method begins upon processor 24 receiving a new WR. The example of FIG. 3 is referred to herein as a "NIC assisted" implementation, because decrementing of the load counters is carried out by the NICs. An alternative embodiment, referred to as a "processor only" implementation, is described further below.

At a counter readout operation 70, processor 24 reads load counters 56 from memory 44. Reading a load counter is regarded herein as one example technique of estimating the amount of communication traffic corresponding to uncompleted WQEs (WQEs that were posted and not yet completed). In alternative embodiments, any other suitable technique can be used.

At a NIC selection operation 74, processor 24 selects the NIC having the smaller value of load counter 56, i.e., the NIC having the smaller communication load. In alternative embodiments, processor 24 may select a NIC using any other suitable selection criterion that aims to balance the load between the NICs. For example, when the load counters of both NICs are below some defined value (i.e., when both NICs are sufficiently idle), processor 24 may select any one of the NICs at random. As another example, if the load on one NIC is higher than the load on another NIC, the processor will post the WR to the less-loaded NIC.

At a WR posting operation 78, processor 24 posts a WQE corresponding to the new WR on one of WQs 48 of the selected NIC. The processor notifies the selected NIC that the WQE has been posted, e.g., by issuing a suitable doorbell.

At a counter incrementing operation 82, processor 24 increments the value of load counter 56 of the selected NIC by the data size (e.g., byte count) of the new WR. Processor 24 may extract the data size of the new WR from the corresponding WQE. In some embodiments, processor 24 increments the load counter using an atomic "fetch and add" instruction. The use of an atomic instruction ensures that no other entity accesses the load counter during the update. This feature is important, for example, when the load counters can be accessed by multiple different processes.

The selected NIC executes the WR in accordance with the posted WQE, at an execution operation 86. Upon completing execution of the WR, the selected NIC posts a CQE on one its CQs 52, at a completion notification operation 90. At a decrementing operation 94, the selected NIC decrements its load counter 56 in memory 44 by the data size (e.g., byte count) of the completed WR. In some embodiments, the selected NIC finds the data size of the completed WR by identifying the WQE that corresponds to the CQE, and extracting the data size from the WQE. In other embodiments the data size is indicated in the CQE, in which case the selected NIC may extract the data size from the CQE without having to identify the corresponding WQE. In some embodiments, the NIC decrements the load counter using an atomic "fetch and add" instruction.

Alternatively to the "NIC assisted" implementation described above, in some embodiments the load balancing process is carried out using a "processor only" implementation. In this implementation, decrementing of the load counter is performed by processor 24. Typically, processor 24 polls the various CQs 52. Upon detecting a newly posted COE on a CQ of a given NIC, processor 24 identifies the WQE that corresponds to the COE, extracts the data size from the WQE, and decrements the load counter of the given NIC by the extracted data size. As noted above, if the data sizes of completed WOEs are indicated in the CQEs, then the step of identifying the corresponding WQE can be omitted.

Typically, although not necessarily, the "processor only" implementation is implemented purely in software. In the "NIC assisted" implementation, on the other hand, the task of decrementing the load counter by the NIC is typically implemented in hardware.

The "NIC assisted" and "processor only" implementations have different pros and cons, and each of them may be preferable under certain circumstances. For example, the "processor only" implementation does not require any modification in the NICs for the purpose of load balancing, and can therefore be used with legacy NICs. The "NIC assisted" implementation, on the other hand, is fast and does not incur software overhead in the processor. The "NIC assisted" implementation also does not require that a process that polls the CQs be always on.

In some embodiments, when using the "NIC assisted" implementation, the NIC may decrement the load counter not only upon completion of a WQE. The NIC may perform an interim update of the load counter during the process of executing a WQE.

Interim updating of the load counter is useful, for example, for keeping the load counter up-to-date when processing very large WRs. Another important advantage of the interim update is that the notification is sent to the processor as soon as the data is sent to the network. In contrast, a conventional completion notification is typically generated only when an acknowledgement packet is received. In such a case, the completion notification is delayed by the network round trip latency.

The NIC may perform an interim update of the load counter, for example, when rescheduling execution of a WQE. More generally, the NIC may perform an interim re-estimation of the communication load during processing of a WQE. The interim re-estimation may be based on the amount of traffic sent to the network and not yet acknowledged. The "amount of traffic sent to the network and not yet acknowledged" typically refers to original first transmissions and not to retransmissions. Traffic that is retransmitted, typically in response to a request or negative acknowledgement from a peer NIC, should not be included in this estimated amount.

Accounting for Actual Communication Rates of NICS

In some embodiments, in estimating the communication loads of NICs 28, processor 24 normalizes the communication loads (e.g., the values of load counters 56) by the respective actual communication rates (or the expected actual communication rates) of the NICs. In other words, processor 24 may use a load balancing criterion that aims to equalize {Load on NIC}/{Actual communication rate of NIC} over all NICs. In an example embodiment, each NIC 28 reports its actual communication rate to processor 24, and the processor uses the reported communication rates for normalizing the communication load estimates. This feature is useful for accounting for differences in network congestion and internal bottlenecks between different NICs 28.

In some embodiments, the communication traffic in system 20 is associated with multiple Virtual Lanes (VLs) or priority classes. Processor 24 may estimate the communication loads and the actual communication rates of the various NICs separately per VL or priority class.

In an example embodiment, processor 24 may estimate the communication load for a VL or priority class based on the estimated communication load of another VL or priority class. In some embodiments, processor 24 estimates the communication load for a given queue, which is associated with a given VL or priority class, based on (i) the communication load on one or more other queues that are associated with the same given VL or priority class, and (ii) the communication load on one or more other queues that are associated with one or more other VLs or priority classes.

The value of the above criterion can be demonstrated by the following example. Consider a configuration having two WQs denoted WQ1 and WQ2. WQ1 is associated with a VL denoted VL1, and WQ2 is associated with another VL denoted VL2. Each VL is eligible for 50% of the network speed, with weighted round robin arbitration. Therefore, if only one of the VLs has work requests to process, it will transmit at full wire speed.

In this configuration, assume that processor 24 has a new WQE that is associated with VL1 (and should therefore be posted to WQ1). Processor 24 should decide whether to post the new WQE on WQ1 of NIC1, or on WQ1 of NIC2. In an embodiment, the decision may be affected by the load on WQ2 (of VL2) in the two NICs. If, for example, the load on WQ1 on both NICs is the same, and on NIC1 there is considerable load on WQ2, processor 24 may prefer to post the new WQE to WQ1 on NIC2 (which can send the WQE at full-wire-speed). On NIC1 the new WOE can only be sent at 50% of the full wire speed due to the load on WQ2/VL2.

Although the embodiments described herein mainly address load balancing among network adapters, the methods and systems described herein can also be used in other applications, such as in load balancing among accelerators.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
- one or more host processors; and
- multiple network adapters, to connect the one or more host processors to a network by (i) communicating with the one or more host processors and (ii) communicating with the network via one or more network interfaces, wherein the one or more host processors are to:
  - exchange communication traffic over the network via the multiple network adapters;
  - estimate pending loads on the multiple network adapters by estimating, for each network adapter, an amount of communication traffic that the one or more host processors requested the network adapter to communicate but the network adapter has not completed; and
  - distribute subsequent communication traffic among the multiple network adapters, responsively to the pending loads.

2. The system according to claim 1, wherein the one or more host processors are to distribute the subsequent communication traffic in accordance with a criterion that aims to balance the pending loads.

3. The system according to claim 1, wherein the one or more host processors are to identify uncompleted work requests associated with a network adapter among the network adapters, and to estimate a pending load of the network adapter by estimating at least an amount of the communication traffic corresponding to the uncompleted work requests.

4. The system according to claim 3, wherein the one or more host processors are to estimate the communication pending load based on both (i) the uncompleted work requests and (ii) one or more read requests sent to the network adapter over the network.

5. The system according to claim 3, wherein the network adapter is to perform an interim re- estimation of the pending load during processing of a work request.

6. The system according to claim 3, wherein the network adapter is to perform an interim re- estimation of the pending load based on an amount of traffic sent to the network and not yet acknowledged.

7. The system according to claim 1, wherein:
- the one or more host processors are to exchange the communication traffic via a network adapter among the network adapters by posting work descriptors, indicative of work requests, on one or more queues associated with the network adapter;
- the network adapter is to issue one or more completion notifications upon completing the work requests; and
- the one or more host processors are to estimate the pending load of the network adapter by (i) incrementing a load counter in response to posting a new work descriptor, and (ii) decrementing the load counter in response to identifying a new completion notification.

8. The system according to claim 7, wherein the one or more host processors are to increment the load counter responsively to a data-size indicated in the new work descriptor.

9. The system according to claim 7, wherein the one or more host processors are to decrement the load counter responsively to a data-size indicated in the new completion notification, or in a work descriptor that corresponds to the new completion notification.

10. The system according to claim 7, wherein the one or more host processors are to increment and decrement the load counter by issuing atomic fetch-and-add instructions.

11. The system according to claim 7, wherein the one or more host processors are to communicate with the network adapter via a peripheral bus, wherein the load counter resides in a memory of the one or more host processors, and wherein the network adapter is configured to increment the load counter by issuing atomic fetch-and-add operations of the peripheral bus.

12. The system according to claim 7, wherein:
- the load counter comprises (i) a first counter to count new work and (ii) a second counter to count completed work; and
- the one or more host processors are to (i) increment the load counter by incrementing the first counter, and (ii) decrementing the load counter by incrementing the second counter.

13. The system according to claim 1, wherein:
- the one or more host processors are to exchange the communication traffic via a network adapter among the network adapters by posting work descriptors, indicative of work requests, on one or more queues associated with the network adapter;
- the network adapter is to issue one or more completion notifications upon completing the work requests;
- the one or more host processors are to increment a load counter in response to posting a new work descriptor;
- the network adapter is to decrement the load counter in response to issuing a new completion notification; and
- the one or more host processors are to estimate the pending load of the network adapter based on the load counter.

14. The system according to claim 13, wherein the network adapter is to decrement the load counter responsively to a data-size indicated in the new completion notification, or in a work descriptor corresponding to the new completion notification.

15. The system according to claim 13, wherein the network adapter is to perform an interim decrement of the load counter during processing of a work request.

16. The system according to claim 1, wherein:
- the network adapters are to indicate to the one or more host processors respective actual communication rates of the network adapters; and
- the one or more host processors are to normalize the pending loads by the respective actual communication rates.

17. The system according to claim 16, wherein the traffic is associated with multiple Virtual Lanes (VLs) or priority classes, and wherein the one or more host processors are to estimate the pending loads and the actual communication rates separately per VL or priority class.

18. The system according to claim 17, wherein the one or more host processors are to estimate a pending load for a VL or priority class based on the estimated pending load of another VL or priority class.

19. The system according to claim 1, wherein the communication traffic is associated with multiple Virtual Lanes (VLs) or priority classes, and wherein the one or more host processors are to estimate a pending load for a given queue, which is associated with a given VL or priority class, based on:

(i) the pending load on one or more other queues that are associated with the given VL or priority class, and (ii) the pending load on one or more other queues that are associated with one or more other VLs or priority classes.

20. A method, comprising:

connecting one or more host processors to a network using multiple network adapters, by (i) communicating with the one or more host processors and (ii) communicating with the network via one or more network interfaces; and using the one or more host processors:

exchanging communication traffic over the network via the multiple network adapters;

estimating pending loads on the multiple network adapters by estimating, for each network adapter, an amount of communication traffic that the one or more host processors requested the network adapter to communicate but the network adapter has not yet completed; and distributing subsequent communication traffic among the multiple network adapters, responsively to the pending loads.

* * * * *